United States Patent
Park et al.

(10) Patent No.: US 8,837,553 B2
(45) Date of Patent: Sep. 16, 2014

(54) METHOD AND APPARATUS FOR ADDITION DATA TRANSMISSION AND RECEPTION IN DIGITAL BROADCAST SYSTEM

(71) Applicants: Electronics and Telecommunications Research Institute, Daejeon (KR); Korean Broadcasting System, Seoul (KR); Nextwill Co., Ltd., Daejeon (KR)

(72) Inventors: Sung Ik Park, Daejeon-si (KR); Hyoungsoo Lim, Daejeon-si (KR); Ho Min Eum, Daejeon-si (KR); Jae Hyun Seo, Daejeon-si (KR); Heung Mook Kim, Daejeon-si (KR); Nam Ho Hur, Daejeon-si (KR); Young Woo Suh, Seoul (KR); Jae Kwon Lee, Seoul (KR); Ha Kyun Mok, Seoul (KR); Won Gi Seo, Daejeon-si (KR); Ju Byung Kim, Daejeon-si (KR)

(73) Assignees: Electronics and Telecommunications Research Institute, Daejeon (KR); Seoul, Republic of Korea, Seoul (KR); Nextwill Co., Ltd., Daejeon (KR)

( * ) Notice: Subject to any disclaimer, the term of this patent is extended or adjusted under 35 U.S.C. 154(b) by 0 days.

(21) Appl. No.: 13/684,485

(22) Filed: Nov. 23, 2012

(65) Prior Publication Data

US 2013/0142219 A1    Jun. 6, 2013

(30) Foreign Application Priority Data

Dec. 1, 2011   (KR) ................. 10-2011-0127471

(51) Int. Cl.
*H04B 1/00*        (2006.01)
*H04N 21/2383*     (2011.01)
*H04N 21/81*       (2011.01)
*H04N 21/438*      (2011.01)
*H04B 1/707*       (2011.01)

(52) U.S. Cl.
CPC ........... *H04B 1/707* (2013.01); *H04N 21/2383* (2013.01); *H04N 21/8126* (2013.01); *H04N 21/4382* (2013.01)
USPC .......................................... 375/140; 375/130

(58) Field of Classification Search
CPC ....................................... H04B 1/707
USPC .......................................... 375/140
See application file for complete search history.

(56) References Cited

U.S. PATENT DOCUMENTS

| | | | |
|---|---|---|---|
| 8,019,275 B2* | 9/2011 | Norin et al. ........... | 455/3.02 |
| 2010/0194635 A1* | 8/2010 | An et al. ............... | 342/357.12 |
| 2010/0238914 A1* | 9/2010 | Feher .................... | 370/342 |
| 2012/0220293 A1* | 8/2012 | Feher .................... | 455/426.1 |

* cited by examiner

*Primary Examiner* — Erin File
(74) *Attorney, Agent, or Firm* — William Park & Associates Ltd.

(57) ABSTRACT

Provided are an apparatus for addition data transmission includes: an IF broadcasting signal generating unit receiving the broadcast data, and FEC and modulation of the received broadcast data to generate a broadcasting signal in an intermediate frequency (IF) band; an IF addition signal generating unit receiving the addition data to generate an addition signal in the IF band by using direct sequence spread spectrum (DSSS); an average power controlling unit controlling average power of the addition signal in the IF band; a signal combining unit combining the broadcasting signal in the IF band and the addition signal in the IF band to generate a combination signal; an RF upward converting unit upwardly converting the combination signal in a signal in a radio frequency (RF) band to a combination signal in the RF band; and a transmitting unit transmitting the combination signal in the RF band.

9 Claims, 15 Drawing Sheets

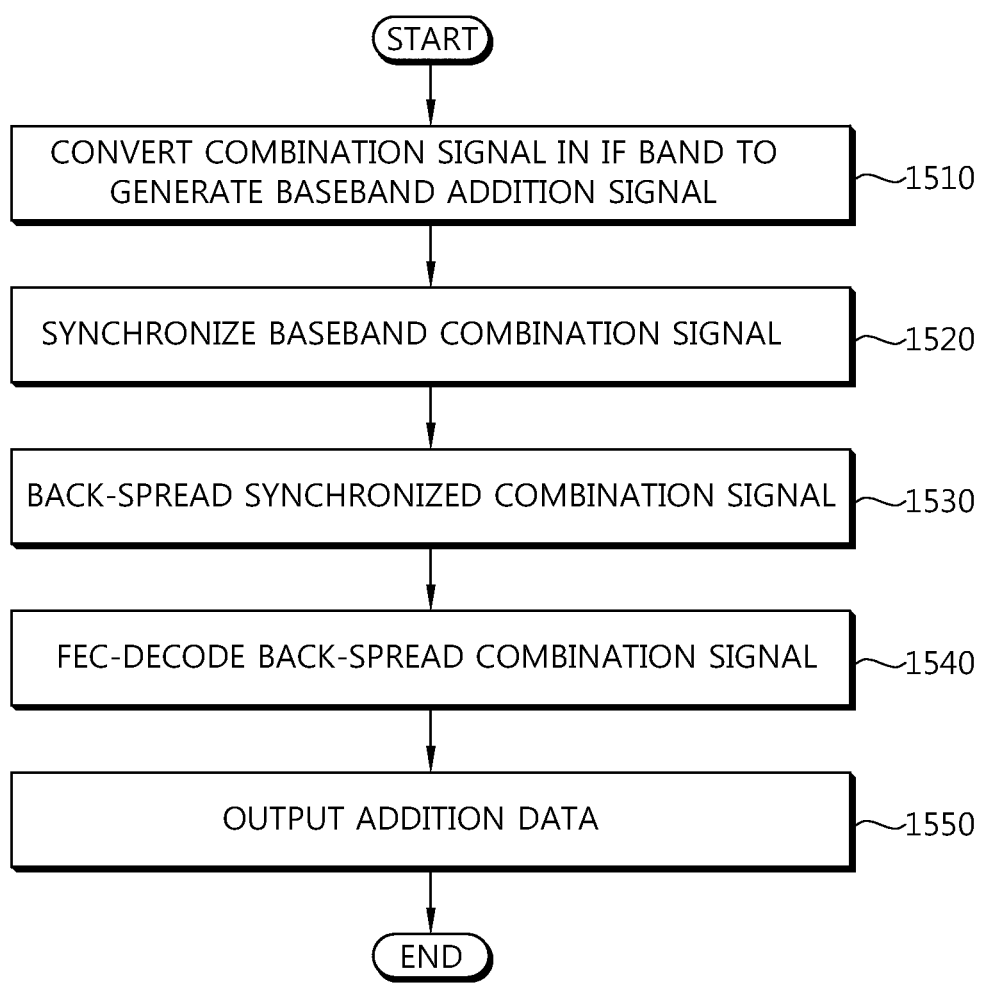

METHOD AND APPARATUS FOR ADDITION DATA TRANSMISSION AND RECEPTION IN DIGITAL BROADCAST SYSTEM

CROSS-REFERENCE TO RELATED APPLICATIONS

This application claims the benefit of priority of Korean Patent Application No. 10-2011-0127471 filed on Dec. 1, 2011, all of which are incorporated by reference in their entirety herein.

BACKGROUND OF THE INVENTION

1. Field of the Invention

The present invention relates to a method and an apparatus for addition data transmission and reception in a digital broadcast system, and more particularly, to an apparatus and a method for transmitting addition data while maintaining backward compatibility with existing broadcast data in a digital broadcast system.

2. Related Art

In general, in an existing broadcast system, data transmission rate is determined according to each standard. For example, data transmission rate of an advanced television systems committee (ATSC) 8-vestigal sideband (VSB) transmission standard is 19.39 mbps in a band of 6 MHz, data transmission rate of a digital video broadcasting-terrestrial (DVB-T) transmission standard is 4.354 Mbps to the minimum to 27.710 Mbps to the maximum in a band of 7 MHz, and data transmission rate of a terrestrial-digital multimedia broadcasting (T-DMB) transmission standard is generally 1.125 Mbps in a band of 1.536 MHz.

Due to development of various services and culture contents, new-concept services such as data broadcasting, a non-real time (NRT) service, a disaster alert service, a public infra control, and the like are emerged and necessity of transmission of additional services are presented. In the existing broadcasting and communication system, a method, which allocates new services to transmission rate of remaining data by reducing data transmission rate of an original service is used in order to additionally provide the new-concept services. For example, in the ATSC 8-VSB system, approximately 2 Mbps is allocated for the new service such as the data broadcasting in 19.39 Mbps allocated for HD broadcasting and existing HD broadcasting is reallocated to remaining 17.4 Mbps. In the related art, since the data transmission rate of the original service is decreased in order to additionally transmit the new services, the quality of the original service deteriorates.

Therefore, in the broadcast system in the related art, a method is urgently needed, in which transmission rate of existing data is maintained, that is, backward compatibility with the existing broadcast system is maintained and addition data are additionally transmitted to increase transmission efficiency, and various methods are proposed for this.

First, in the ATSC system, a method is presented in prior art, which can transmit addition data by using a polarity and an amplitude level of a transmitter identification (TxID) signal used to configure a single frequency network (SFN).

In an existing TxID based addition data transmission method using the polarity and the amplitude level, the addition data can be transmitted through the TxID signal while a transmitter identification function as an original object of the TxID signal is maintained. However, the method using the polarity and the amplitude level in the related art has a problem in that transmission rate (tens to hundreds bps) is very low.

In order to complement the problem that the transmission rate is very low, a method for addition data transmission by using a phase and a polarity of a TxID sequence and a method for addition data transmission by combining an additional orthogonal sequence and the TxID signal are presented in prior art. In the presented methods, the addition data of several Kbps can be transmitted.

The presented method for addition data transmission based on the TxID signal has advantages to transmit the addition data of hundreds bps to several Kbps while maintaining backward compatibility with the existing digital broadcast system. However, since the existing DTV signal and TxID signal are combined before modulation, a modulator of a transmitter without a TxID function, which has already been installed needs to be replaced. Moreover, since the performance of an addition data receiver, particularly, the performance of a demodulation unit including a synchronous unit fully depends on the demodulation performance of the existing DTV signal, the addition data is not detected at a low signal to noise ratio (SNR). The method for addition data transmission based on TxID is very vulnerable to a multi-path signal and is impossible to perform mobile reception.

Accordingly, an apparatus and a method for addition data transmission are keenly required, which can ensure excellent reception performance in at the low SNR and under a multi-path environment while maintaining backward compatibility with the existing broadcasting signal without changing the existing digital broadcast system.

SUMMARY OF THE INVENTION

The present invention provides an apparatus and a method for transmitting and receiving addition data in a digital broadcast system that can additionally transmit and receive the addition data while maintaining backward compatibility with the existing broadcasting data in the digital broadcast system.

The present invention also provides an apparatus and a method for transmitting and receiving addition data in a digital broadcast system that can transmit and receive a combination signal after generating the existing broadcasting signal, generating an addition signal to be additionally transmitted based on a direct sequence spread spectrum (DSSS) technique and controlling the power of the generated addition signal, which is combined with the existing broadcasting signal in an IF or RF band.

In an aspect, an apparatus for broadcast data and addition data transmission in a digital broadcast system is provided. The apparatus includes: an IF broadcasting signal generating unit receiving the broadcast data, and FEC and modulation of the received broadcast data to generate a broadcasting signal in an intermediate frequency (IF) band; an IF addition signal generating unit receiving the addition data to generate an addition signal in the IF band by using direct sequence spread spectrum (DSSS); an average power to controlling unit controlling average power of the addition signal in the IF band; a signal combining unit combining the broadcasting signal in the IF band and the addition signal in the IF band to generate a combination signal; an RF upward converting unit upwardly converting the combination signal in a signal in a radio frequency (RF) band to a combination signal in the RF band; and a transmitting unit transmitting the combination signal in the RF band.

The addition signal in the IF band and the broadcasting signal in the IF band may have the same IF band.

The IF addition signal generating unit may include: an FEC encoding unit FEC-encoding the addition data; a symbol mapper converting the FEC-encoded addition data into a symbol to generate symbol-type addition data; a signal synthesizing unit generating a spread addition signal based on the symbol-type addition data and an orthogonal or quasi-orthogonal signal for spectrum-spreading the addition data; a pulse shaping filter (PSF) band-limiting the spread addition signal to be converted into a spectrum of a pattern suitable for a wireless broadcasting channel to thereby a baseband addition signal; and an IF upward converting unit upwardly converting the baseband addition signal to generate the addition signal in the IF band.

The IF addition signal generating unit may further include: a preamble signal generating portion generating a preamble signal which is repeated periodically; and a multiplexing portion performing serial concatenation of the preamble signal and the spread addition signal.

A sampling frequency of the spread addition signal may be integer (N) times more than a sampling frequency of the symbol mapper.

The average power controlling unit may include: a first average power calculating unit calculating average power of the broadcasting signal in the IF band; a second average power calculating unit calculating average power of the addition signal in the IF band; an insertion level determining unit comparing the average power of the broadcasting signal in the IF band and the average power of the addition signal in the IF band to determine an insertion level, the insertion level being a constant that makes the average power of the addition signal be significantly lower than the average power of the broadcasting signal; and a multiplying unit multiplying the addition signal in the IF band by the insertion level.

In another aspect, an apparatus for broadcast data and addition data transmission in a digital broadcast system is provided. The apparatus includes: an IF broadcasting signal generating unit receiving the broadcast data, and FEC and modulation of the received broadcast data to generate a broadcasting signal in an intermediate frequency (IF) band; a first RF upward converting unit upwardly converting the broadcasting signal in the IF band into a signal in a radio frequency (RF) band to generate a broadcasting signal in the RF band; an IF addition signal generating unit receiving the addition data to generate an addition signal in the IF band by using direct sequence spread spectrum (DSSS); a second RF upward converting unit upwardly converting the addition signal in the IF band into the signal in the RF band to an addition signal in the RF band; an average power controlling unit controlling average power of the addition signal in the RF band; a signal combining unit combining the broadcasting signal in the RF band and the addition signal in the RF band to generate a combination signal in the RF band; and a transmitting unit transmitting the combination signal in the RF band.

The IF addition signal generating unit may include: an FEC encoding unit FEC-encoding the addition data; a symbol mapper converting the FEC-encoded addition data into a symbol to generate symbol-type addition data; a signal synthesizing unit generating a spread addition signal based on the symbol-type addition data and an orthogonal or quasi-orthogonal signal for spectrum-spreading the addition data; a pulse shaping filter (PSF) band-limiting the spread addition signal to be converted into a spectrum of a pattern suitable for a wireless broadcasting channel to thereby a baseband addition signal; and an IF upward converting unit upwardly converting the baseband addition signal to generate the addition signal in the IF band.

The average power controlling unit may include: a first average power calculating unit calculating average power of the broadcasting signal in the RF band; a second average power calculating unit calculating average power of the addition signal in the RF band; an insertion level determining unit comparing the average power of the broadcasting signal in the RF band and the average power of the addition signal in the RF band to determine an insertion level, the insertion level being a constant that makes the average power of the addition signal be significantly lower than the average power of the broadcasting signal; and a multiplying unit multiplying the addition signal in the RF band by the insertion level.

In another aspect, an apparatus for broadcast data and addition data reception in a digital broadcast system is provided. The apparatus includes: a receiving unit receiving a combination signal in a radio frequency (RF) band; an IF downward converting unit downwardly converting the combination signal into a signal in an intermediate frequency (IF) band to generate a combination signal in the IF band; a broadcast data outputting unit receiving the combination signal in the IF band, and demodulating and FEC-decoding the received combination signal to output the broadcast data; and an addition data outputting unit receiving the combination signal in the IF band to output the addition data by using direct sequence spread spectrum (DSSS).

The addition data outputting unit may include: a base band downward converting unit downwardly converting the combination signal in the IF band to generate a baseband combination signal; a synchronizing unit synchronizing the baseband combination signal; a back-spreading unit back-spreading the synchronized combination signal; and an FEC decoding unit FEC-decoding the back-spread combination signal to output the addition data.

In another aspect, an apparatus for addition data reception in a digital broadcast system is provided. The apparatus includes: a receiving unit receiving a combination signal in a radio frequency (RF) band; an IF downward converting unit downwardly converting the combination signal into a signal in an intermediate frequency (IF) band to generate a combination signal in the IF band; a broadcast data outputting unit receiving the combination signal in the IF band, and demodulating and FEC-decoding the received combination signal to output the broadcast data; and an addition data outputting unit receiving the combination signal in the IF band to output the addition data by using direct sequence spread spectrum (DSSS).

The addition data outputting unit may include: a base band downward converting unit downwardly converting the combination signal in the IF band to generate a baseband combination signal; a synchronizing unit synchronizing the baseband combination signal; a back-spreading unit back-spreading the synchronized combination signal; and an FEC decoding unit FEC-decoding the back-spread combination signal to output the addition data.

In another aspect, a method for broadcast data and addition data transmission in a digital broadcast system is provided. The method includes: receiving the broadcast data, and FEC and modulation of the received broadcast data to generate a broadcasting signal in an intermediate frequency (IF) band; receiving the addition data to generate an addition signal in the IF band by using direct sequence spread spectrum (DSSS); controlling average power of the addition signal in the IF band; combining the broadcasting signal in the IF band and the addition signal in the IF band to generate a combination signal; upwardly converting the combination signal in a signal in a radio frequency (RF) band to a combination signal in the RF band; and transmitting the combination signal in the RF band.

The generating of the IF addition signal may include: FEC-encoding the addition data; converting the FEC-encoded addition data into a symbol to generate symbol-type addition data; generating a spread addition signal based on the symbol-type addition data and an orthogonal or quasi-orthogonal signal for spectrum-spreading the addition data; band-limiting the spread addition signal to be converted into a spectrum of a pattern suitable for a wireless broadcasting channel to thereby a baseband addition signal; and upwardly converting the baseband addition signal to generate the addition signal in the IF band.

The controlling of the average power may include: calculating first average power of the broadcasting signal in the IF band; calculating second average power of the addition signal in the IF band; comparing the average power of the broadcasting signal in the IF band and the average power of the addition signal in the IF band to determine an insertion level, the insertion level being a constant that makes the average power of the addition signal be significantly lower than the average power of the broadcasting signal; and multiplying the addition signal in the IF band by the insertion level.

In another aspect, a method for broadcast data and addition data reception in a digital broadcast system is provided. The method includes: receiving a combination signal in a radio frequency (RF) band; downwardly converting the combination signal into a signal in an intermediate frequency (IF) band to generate a combination signal in the IF band; receiving the combination signal in the IF band, and demodulating and FEC-decoding the received combination signal to output the broadcast data; and receiving the combination signal in the IF band to output the addition data by using direct sequence spread spectrum (DSSS).

The outputting of the addition data may include: downwardly converting the combination signal in the IF band to generate a baseband combination signal; synchronizing the baseband combination signal; back-spreading the synchronized combination signal; and FEC-decoding the back-spread combination signal to output the addition data.

BRIEF DESCRIPTION OF THE DRAWINGS

FIG. 15 is a detailed flowchart, in detail, illustrating outputting addition data of the method for addition data reception in the digital broadcast system according to the exemplary embodiment of the present invention.

DESCRIPTION OF EXEMPLARY EMBODIMENTS

Figure 1:
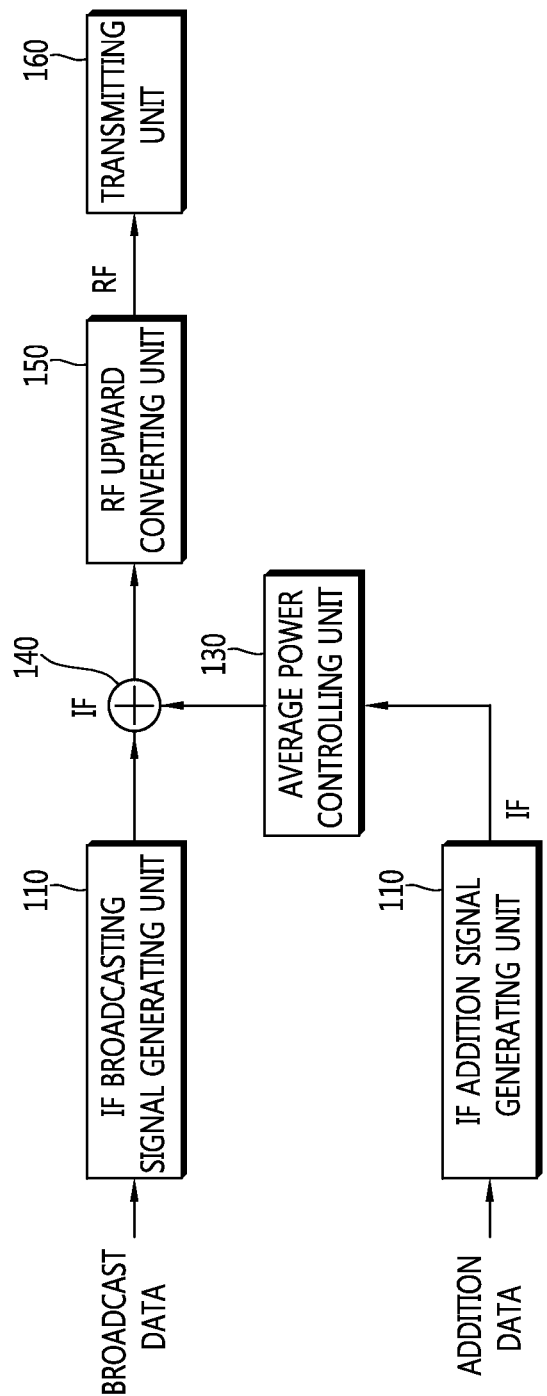
FIG. 1 is a block diagram schematically illustrating the structure of an apparatus for addition data transmission in a digital broadcast system according to an exemplary embodiment of the present invention.

Although the present invention can be modified variously and have several embodiments, specific exemplary embodiments are illustrated in the accompanying drawings and will be described in detail.

However, the present invention is not limited to the specific embodiments and should be construed as including all the changes, equivalents, and substitutions included in the spirit and scope of the present invention.

Terms such as 'first', 'second', and the like may be used to describe various elements, but the elements should not be limited by the terms. The terms are used only to discriminate one element from other elements. For example, the first component may be called the second component without departing from the scope of the present invention. Likewise, the second component may be called the first component. A term 'and/or' includes a combination of a plurality of items or any one of a plurality of terms.

Stated that any components are "connected" or "coupled" to other components, it is to be understood that the components may be directly connected or coupled to other components, but another component may intervene therebetween. On the other hand, stated that any components are "directly connected" or "directly coupled" to other components, it is to be understood that there is no another component therebetween.

The terms used in the specification is used to describe only specific embodiments and is not intended to limit the present invention. The singular forms are intended to include the plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms has the same meaning as those that are understood by those who skilled in the art. It must be understood that the terms defined by the dictionary are identical with the meaning of the context of the related art, and they should not be ideally or excessively formally defined unless the context clearly dictate otherwise.

Hereinafter, exemplary embodiments of the present invention will be described in more detail with reference to the accompanying drawings. In describing the present invention, in order to ease overall understanding, throughout the accompanying drawings, the same reference numerals are used to designate the same or similar components, and redundant descriptions thereof are omitted.

FIG. 1 is a block diagram schematically illustrating the structure of an apparatus for addition data transmission in a digital broadcast system according to an exemplary embodiment of the present invention. As illustrated in FIG. 1, the apparatus for addition data transmission may include an IF broadcasting signal generating unit 110, an IF addition signal generating unit 120, an average power controlling unit 130, a signal combining unit 140, an RF upward converting unit 150 and a transmitting unit 160.

Referring to FIG. 1, the IF broadcasting signal generating unit 110 receives broadcast data as an input to generate a broadcasting signal in an IF band. The IF broadcasting signal generating unit 110 performs forward error correction (FEC) encoding corresponding to a transmission standard of a broadcast system. The IF broadcasting signal generating unit 110 modulates the broadcast data into the broadcasting signal in the IF band.

The IF addition signal generating unit 120 receives addition data to be additionally transmitted as an input to generate an addition signal in the same IF band as the broadcasting signal in the IF band generated by the IF broadcasting signal generating unit 110. In this case, the addition signal in the IF band is generated based on a direct sequence spread spectrum (DSSS) technique. In the DSSS as a scheme in which one signal symbol is spread at a predetermined sequence to be communicated, when an original signal is inputted into a pseudo-random noise sequence, a band spectrum signal in which power density per frequency is decreased is acquired. Therefore, an extended frequency band is obtained and data may be stably transmitted by reducing a transmission failure. The IF addition signal generating unit 120 will now be described in detail with reference to FIG. 4.

The average power controlling unit 130 controls average power of the addition signal in the IF band generated by the IF addition signal generating unit 120. The average power controlling unit 130 makes the average power of the addition signal in the IF band be significantly lower than the average power of the broadcasting signal in the IF band by using an insertion level.

The signal combining unit 140 combines the addition signal in the IF band, of which the average power is controlled by the average power controlling unit 130 and the broadcasting signal in the IF band generated by the IF broadcasting signal generating unit 110 in the IF band to generate a combination signal in the IF band.

The RF upward converting unit 150 upwardly converting the combination signal in the IF band generated by the signal combining unit 140 into the combination signal in the RF band to generate the combination signal in the RF band.

The transmitting unit 160 wirelessly transmits the combination signal in the RF band generated by the RF upward converting unit 150 to a receiving side.

According to the exemplary embodiment of the present invention, the apparatus for addition data transmission has an advantage capable of transmitting addition data without changing the existing digital broadcasting apparatus. That is, the existing digital broadcasting apparatus also includes a component for FEC encoding and modulation, a component for RF upward conversion, and a component for transmission. When the IF addition signal generating unit 120, the average power controlling unit 130 and the signal combining unit 140 such as an analog combiner are added to the existing digital broadcasting apparatus including the components, the addition data may be additionally transmitted as in the exemplary embodiment of the present invention.

Figure 2:
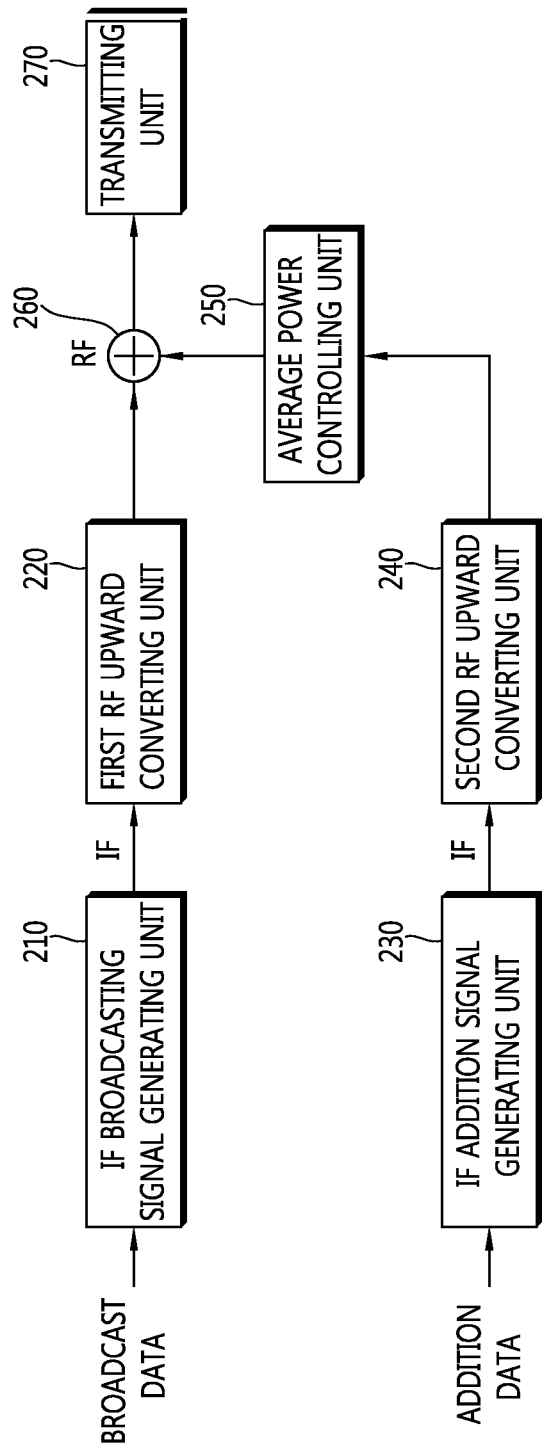
FIG. 2 is a block diagram schematically illustrating the structure of an apparatus for addition data transmission in a digital broadcast system according to another exemplary embodiment of the present invention.

FIG. 2 is a block diagram schematically illustrating the structure of an apparatus for addition data transmission in a digital broadcast system according to another exemplary embodiment of the present invention. As illustrated in FIG. 2, the apparatus for addition data transmission according to another exemplary embodiment of the present invention may include an IF broadcasting signal generating unit 210, a first RF upward converting unit 220, an IF addition signal generating unit 230, a second RF upward converting unit 240, an average power controlling unit 250, a signal combining unit 260 and a transmitting unit 270.

Referring to FIG. 2, the IF broadcasting signal generating unit 210 receives the broadcast data as the input to generate the broadcasting signal in an IF band. The IF broadcasting signal generating unit 210 performs forward error correction (FEC) encoding corresponding to the transmission standard of the broadcast system and performs modulation to the broadcasting signal in the IF band.

The first RF upward converting unit 220 upwardly converts the broadcasting signal in the IF band generated by the IF broadcasting signal generating unit 210 to generate a broadcasting signal in the RF band.

The IF addition signal generating unit 230 receives the addition data to be additionally transmitted as the input to generate an addition signal in the IF band. In this case, the addition signal in the IF band is generated based on the DSSS technique.

The second RF upward converting unit 240 upwardly converts the addition signal in the IF band generated by the IF addition signal generating unit 230 to generate an addition signal in the RF band.

The average power controlling unit 250 controls average power of the addition signal in the RF band generated by the second RF upward converting unit 240. The average power controlling unit 250 makes the average power of the addition signal in the RF band be significantly lower than the average power of the broadcasting signal in the RF band by using the insertion level.

The signal combining unit 260 combines the addition signal in the RF band, of which the average power is controlled by the average power controlling unit 250 and the broadcasting signal in the RF band generated by the first RF upward converting unit 220 in the RF band to generate a combination signal in the RF band.

The transmitting unit 270 wirelessly transmits the combination signal in the RF band generated by the signal combining unit 260 to the receiving side.

As compared with the apparatus of FIG. 1, the apparatus of FIG. 2 differs from the apparatus of FIG. 1 in that the RF upward converting unit is further provided to perform upward conversion into each of the broadcasting signal and the addition signal into the RF band and the signals are combined in not the IF band but the RF band.

Figure 3:
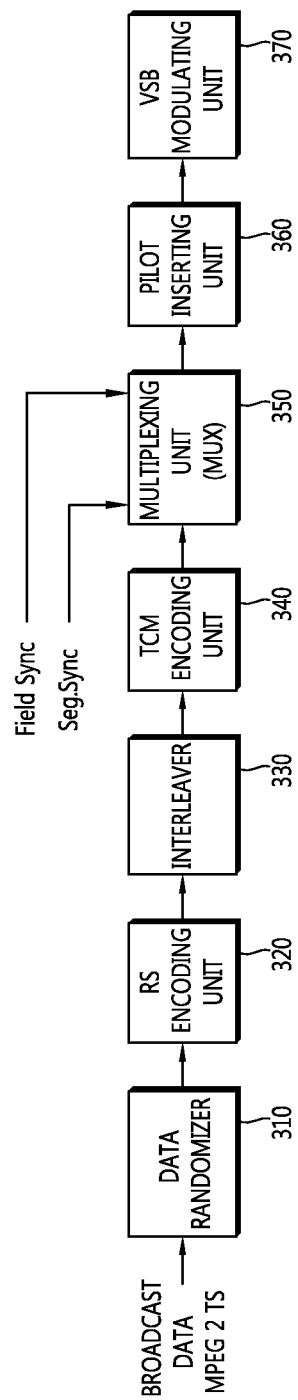
FIG. 3 is a detailed block diagram, in detail, illustrating an IF broadcasting signal generating unit of the apparatus for addition data transmission in the digital broadcast system according to the exemplary embodiment of the present invention.

FIG. 3 is a detailed block diagram, in detail, illustrating the IF broadcasting signal generating unit 110 of the apparatus for addition data transmission in the digital broadcast system according to the exemplary embodiment of the present invention. As illustrated in FIG. 3, the IF broadcasting signal generating unit 110 may include a data randomizer 310, an RS encoding unit 320, an interleaver 330, a TCM encoding unit 340, a multiplexing unit (MUX) 350, a pilot inserting unit 360 and a VSB modulating unit 370. The IF broadcasting signal generating unit 110 is based on an ATSC 8-VSB transmission standard using an MPEG-2 TS (transport stream) as the existing broadcast data.

Referring to FIG. 3, the data randomizer 310 receives MPEG-2 TS data which is the existing broadcast data as the input and randomly modifies data to generate randomly modified MPEG-2 TS data. The MPEG-2 TS data that is randomly modified by the data randomizer 310 is outer-encoded by the RS encoding unit 320 which has an excellent burst error correction ability and the data outer-encoded by the RS encoding unit 320 is interleaved by the interleaver 330.

The data interleaved by the interleaver 330 is inner-encoded by the TCM encoding unit 340 which is a kind of a convolutional code. The signal inter-encoded by the TCM encoding unit 340 is multiplexed with field synchronization and segment synchronization signals by the multiplexing unit (MUX) 350 to be converted into a baseband ATSC broadcasting signal.

The pilot inserting unit 360 inserts a pilot signal for synchronizing a receiver into the baseband ATSC broadcasting signal converted by the multiplexing unit 350. The pilot inserting unit 360 may insert the pilot signal into the baseband ATSC broadcasting signal which is an output signal of the multiplexing unit 350 as illustrated in Equation 1.

$$t(n)=d(n)+1.25 \qquad \text{[Equation 1]}$$

Herein, d(n) as the baseband ATSC broadcasting signal for the existing transmission may have values of −7, −5, −3, −1, +1, +3, +5, and +7. 1.25 means a pilot signal added to the baseband ATSC broadcasting signal and t(n) means the baseband broadcasting signal inserted with the pilot signal.

The VSB modulating unit 370 modulates the baseband ATSC broadcasting signal inserted with the pilot signal into a VSB signal in an IF band.

In the present invention, the IF broadcasting signal generating unit 110 is not limited to the ATSC 8-VSB system but as the IF broadcasting signal generating unit 110, various broadcasting and communication standards may be used.

Figure 4:
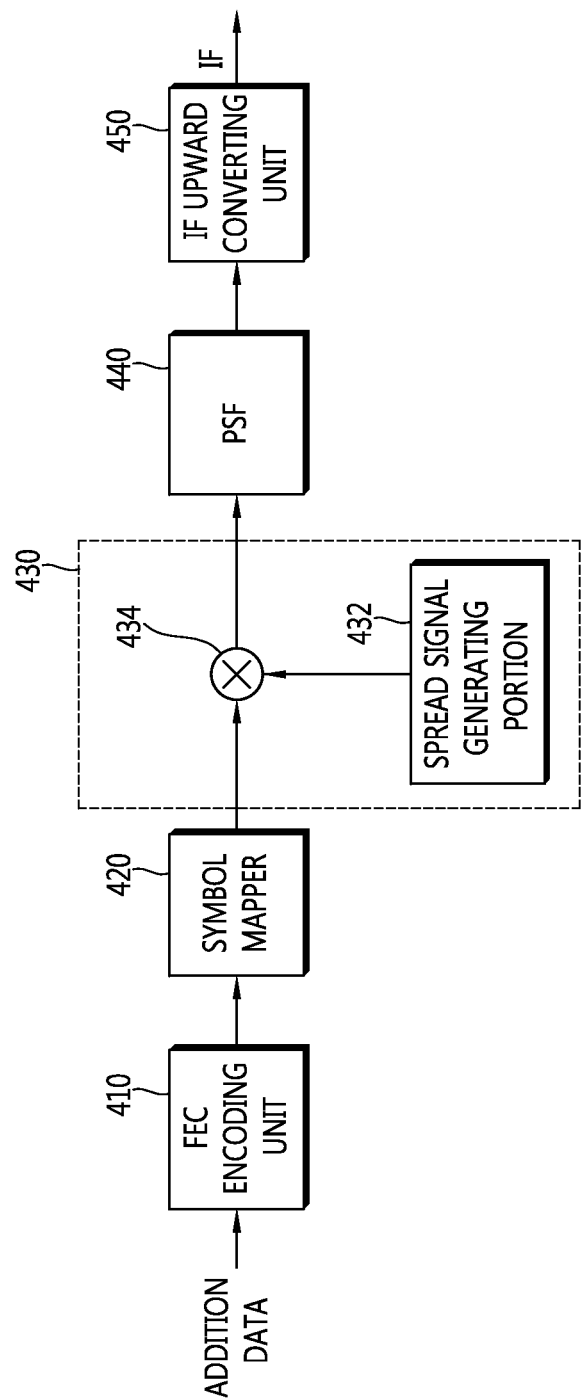
FIG. 4 is a detailed block diagram, in detail, illustrating an IF addition signal generating unit of the apparatus for addition data transmission in the digital broadcast system according to the exemplary embodiment of the present invention.

FIG. 4 is a detailed block diagram, in detail, illustrating the IF addition signal generating unit 120 of the apparatus for addition data transmission in the digital broadcast system according to the exemplary embodiment of the present invention. As illustrated in FIG. 4, the IF addition signal generating unit 120 of the apparatus for addition data transmission according to the exemplary embodiment of the present invention may include an FEC encoding unit 410, a symbol mapper 420, a signal synthesizing unit 430, a pulse shaping filter (PSF) 440, and an IF upward converting unit 450. As described above, the IF addition signal generating unit 120 is configured to generate additional addition data to the existing broadcasting signal based on the DSSS technique.

Referring to FIG. 4, the addition data for additional transmission is FEC (forward error correction)-encoded by the FEC encoding unit 410. Herein, the addition data for additional transmission, that is, data inputted by the FEC encoding unit 410 may be compressed in various methods such as H.264 or MPEG 4 as necessary and is not particularly limited thereto. This may depend on the standard and requirements of the system.

The data FEC-encoded by the FEC encoding unit 410 is converted into a symbol by the symbol mapper 420. Herein, the symbol mapper 420 may use various mapping methods including binary phase shift keying (BPSK), quadrature phase shift keying (QPSK), quadrature amplitude modulation (QAM), and the like and the mapping method is not particularly limited thereto. This may depend on the standard and requirements of the system.

The signal synthesizing unit 430 generates an addition signal spread based on the symbol-type addition data generated by the symbol mapper 420 and an orthogonal or quasi-orthogonal signal for spectrum-spreading the addition data. The signal synthesizing unit 430 may include a spread signal generating portion 432 and a multiplying portion 434. The spread signal generating portion 432 generates the orthogonal or quasi-orthogonal signal for spectrum-spreading the addition data. According to the exemplary embodiment of the present invention, the orthogonal signal may a Walsh signal and the quasi-orthogonal signal is a psendo noise (PN) signal. The orthogonal signal and the quasi-orthogonal signal are not limited to the Walsh signal and the PN signal, but may depend on the standard and the requirements of the system. The multiplying portion 434 multiplies the symbol-type addition signal generated by the symbol mapper 420 by the orthogonal or quasi-orthogonal signal generated by the spread signal generating portion 432. This process is called spreading. According to the exemplary embodiment of the present invention, a sampling frequency of the spread signal may be N times more than a sampling frequency of an output signal of the symbol mapper 420. In this case, the output signal of the symbol mapper 420 has a spreading a gain as large as 10 $\log_{10}$N dB due to spreading.

The PSF 440 bandwidth-limits the signal outputted by the multiplying portion 434, that is, the addition signal spectrum-spread by the spread signal to convert the signal into a spectrum of a type suitable for a wireless broadcasting channel. According to the exemplary embodiment of the present invention, as the PSF, filters may be used, which include a root raised cosine (RRC) filter, a Gaussian filter, an equi-ripple (ER) filter, and the like according to the spectrum type, however, the PSF is not particularly limited thereto. Selection of the PSF may depend on the standard and requirements of the system.

The IF upward converting unit 450 converts a baseband addition signal generated by the PSF 440 into a signal in the IF band.

Figure 5:
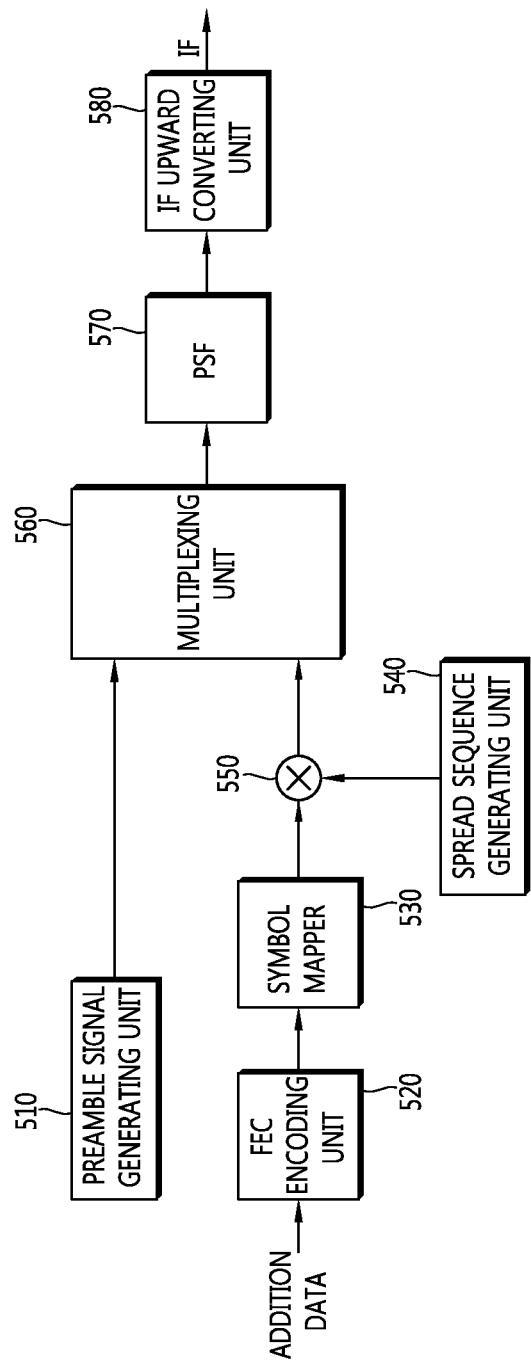
FIG. 5 is a detailed block diagram, in detail, illustrating a structure to add a preamble for synchronization with the addition signal band-spread in order to enforce the reception performance of the IF addition signal generating unit of FIG. 4.

FIG. 5 is a detailed block diagram, in detail, illustrating a structure to add a preamble for synchronization with the addition signal band-spread in order to enforce the reception performance of the IF addition signal generating unit 120 of FIG. 4. The preamble signal as a signal appointed between a transmitter and the receiver assists synchronization between the transmitter and the receiver. As illustrated in FIG. 5, the IF addition signal generating unit 120 having the structure additionally including the preamble may include a preamble signal generating unit 510, an FEC encoding unit 520, a symbol mapper 530, a spread sequence generating unit 540, a multiplying unit 550, a multiplexing unit 560, a PSF 570, and an IF upward converting unit 580.

In the exemplary embodiment, the FEC encoding nit 520, the symbol mapper 530, the spread sequence generating unit 540, the multiplying unit 550, the PSF 570, and the IF upward converting unit 580 have the same functions as the FEC encoding unit 410, the symbol mapper 430, the spread signal generating portion 432, the multiplying portion 434, the PSF 440, and the IF upward converting unit 450 of FIG. 4. Therefore a description thereof will be omitted.

Referring to FIG. 5, the preamble signal generating unit 510 generates the preamble signal which is repeated periodically in order to enforce the reception performance of the addition signal generated based on the DSSS technique, particularly, the reception performance of a synchronization unit. Herein, the preamble signal is a signal appointed for synchronization between the transmitter and the receiver. Selection of the preamble signal may depend on the standard and requirements of the system.

The multiplexing unit 560 performs serial concatenation of the preamble signal appointed between the transmitter and the receiver, which is generated by the preamble signal generating unit 510 and the output signal of the multiplying unit 550, that is, the addition signal spectrum-spread by the spread signal.

Figure 6:
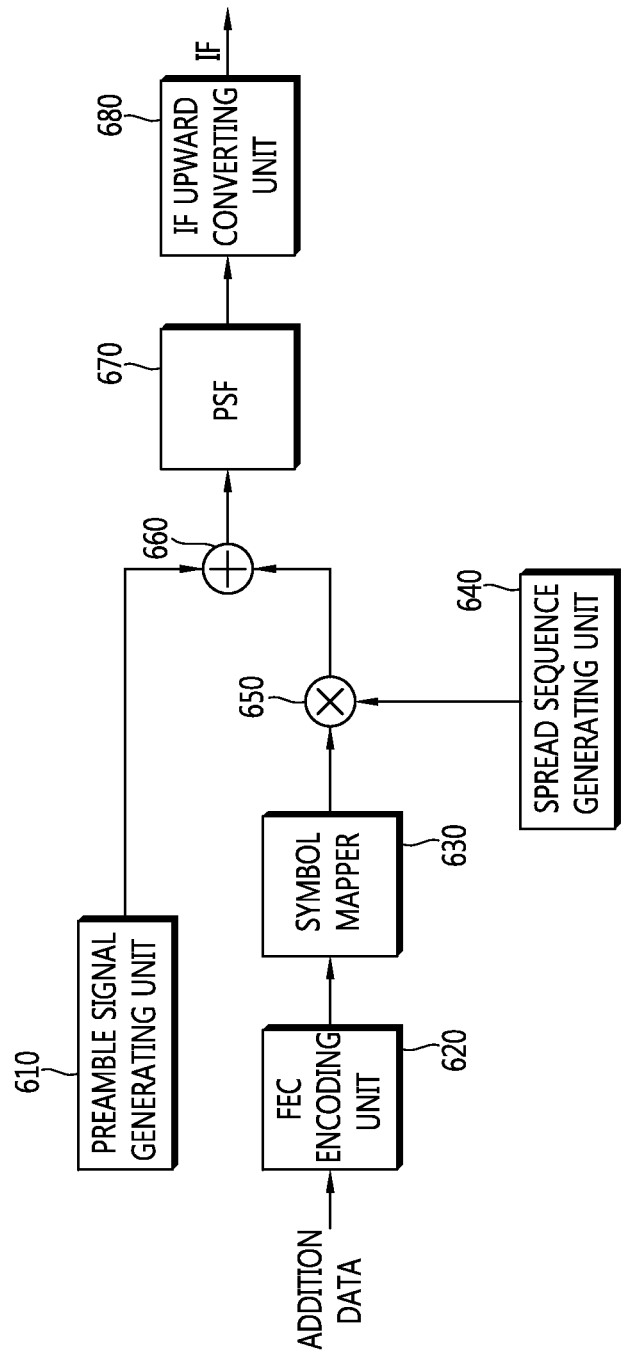
FIG. 6 is a detailed block diagram, in detail, illustrating a structure to add a preamble for superimposition with the addition signal band-spread in order to enforce the reception performance of the IF addition signal generating unit of FIG. 4.

FIG. 6 is a detailed block diagram, in detail, illustrating a structure to add a preamble for superimposition with the addition signal spectrum-spread in order to enforce the reception performance of the IF addition signal generating unit 120 of FIG. 4. The IF addition signal generating unit 120 illustrated in the exemplary embodiment of FIG. 5 generates the addition signal in the IF band by multiplexing with the preamble signal, while the IF addition signal generating unit 120 illustrated in the exemplary embodiment of FIG. 6 generates the addition signal in the IF band through superimposition with the preamble signal. As illustrated in FIG. 6, the IF addition signal generating unit 120 having the structure to add the preamble for superimposition with the spectrum-spread addition signal may include a preamble signal generating unit 610, an FEC encoding unit 620, a symbol mapper 630, a spread sequence generating unit 640, a multiplying unit 650, a signal superimposing unit 660, a PSF 670, and an IF upward converting unit 680.

In the exemplary embodiment, the FEC encoding nit 620, the symbol mapper 630, the spread sequence generating unit 640, the multiplying unit 650, the PSF 670, and the IF upward converting unit 680 have the same functions as the FEC encoding nit 410, the symbol mapper 420, the spread signal generating portion 432, the multiplying portion 434, the PSF 440, and the IF upward converting unit 450 of FIG. 4 and the preamble signal generating unit 610 has the same function as the preamble signal generating unit 510 of FIG. 5. Therefore a description thereof will be omitted.

The signal superimposing unit 660 which is the component different from the exemplary embodiment of FIG. 5 superimposes the preamble signal appointed between the transmitter and the receiver, which is generated by the preamble signal generating unit 610 and the output signal of the multiplying unit 650, that is, the addition signal spectrum-spread by the spread signal with each other.

Figure 7:
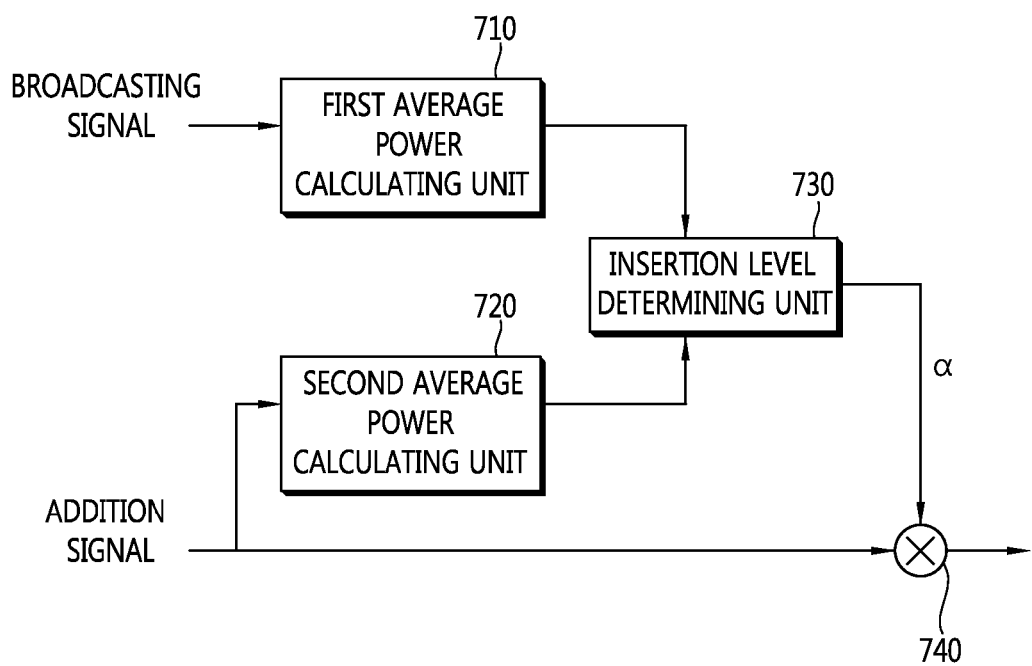
FIG. 7 is a detailed block diagram, in detail, illustrating an average power controlling unit of the apparatus for addition data transmission in the digital broadcast system according to the exemplary embodiment of the present invention.

FIG. 7 is a detailed block diagram, in detail, illustrating an average power controlling unit 130 of the apparatus for addition data transmission in the digital broadcast system according to the exemplary embodiment of the present invention. As illustrated in FIG. 7, the average power controlling unit 130 may include a first average power calculating unit 710, a second average power calculating unit 720, an insertion level determining unit 730, and a multiplying unit 740.

Referring to FIG. 7, the first average power calculating unit 710 calculates average power of the broadcasting signal in the IF band or RF band. The second average power calculating unit 720 calculates average power of the addition signal in the IF band or RF band.

The insertion level determining unit 730 compares the average power of the broadcasting signal calculated by the first average power calculating unit 710 and the average power of the addition signal calculated by the second average power calculating unit 720 to determine an insertion level $\alpha$. The insertion level $\alpha$ is a constant that makes the average power of the addition signal be significantly lower than the average power of the broadcasting signal.

The multiplying unit 740 multiplies the addition signal in the IF band or RF band by the insertion level $\alpha$ determined by the insertion level determining unit 730. The multiplying unit 740 multiplies the addition signal in the IF band or RF band by the insertion level $\alpha$ to control the average power of the addition signal in the IF band or RF band. The average power of the addition signal in the IF band or RF band is made to be significantly lower, and as a result, the existing receiver may recognize additional data as noise.

Figure 8:
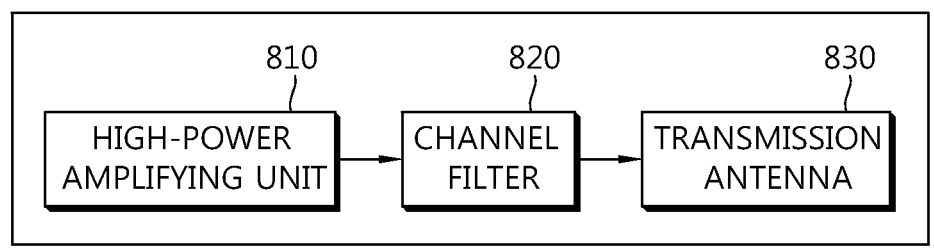
FIG. 8 is a detailed block diagram, in detail, illustrating a transmitting unit of the apparatus for addition data transmission in the digital broadcast system according to the exemplary embodiment of the present invention.

FIG. 8 is a detailed block diagram, in detail, illustrating the transmitting unit 160 of the apparatus for addition data transmission in the digital broadcast system according to the exemplary embodiment of the present invention. As illustrated in FIG. 8, the transmitting unit 160 may include a high-power amplifying unit 810 a channel filter 820, and a transmission antenna 830.

Referring to FIG. 8, an output signal in the RF band, which is outputted from the RF upward converting unit 150 is amplified into a signal having high power by the high-power amplifying unit 810. Then, the amplified signal is filtered by the channel filter 820 and thereafter, wirelessly transmitted through the transmission antenna 830.

Figure 9:
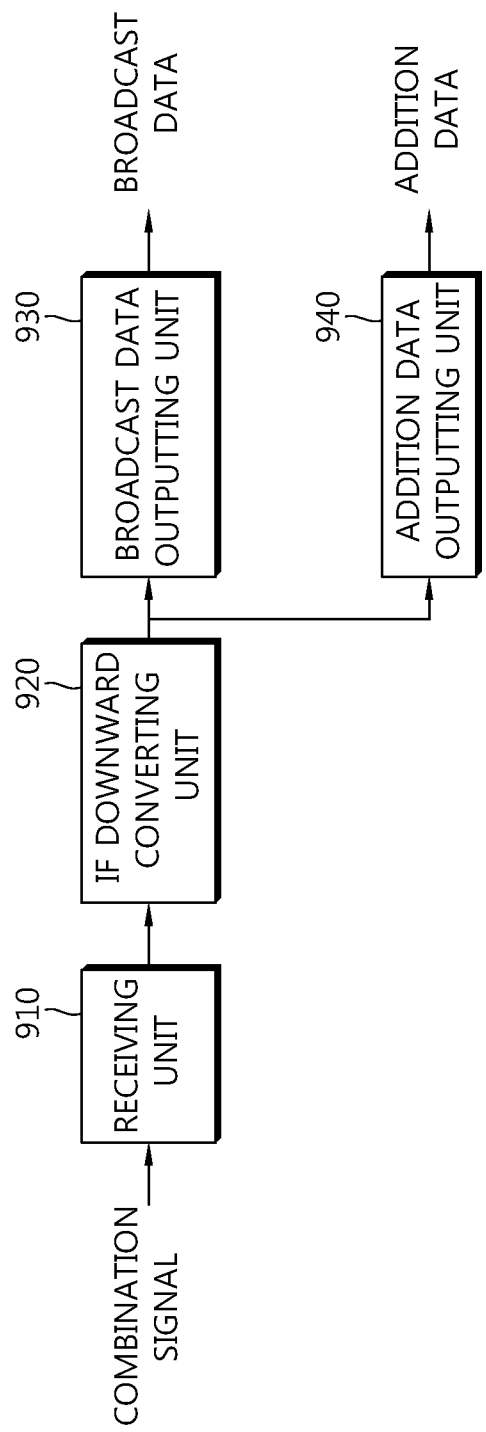
FIG. 9 is a block diagram schematically illustrating an apparatus for addition data reception in the digital broadcast system according to another exemplary embodiment of the present invention.

FIG. 9 is a block diagram schematically illustrating an apparatus for addition data reception in the digital broadcast system according to the exemplary embodiment of the present invention. As illustrated in FIG. 9, the apparatus for addition data reception according to the exemplary embodiment of the present invention may include a receiving unit 910, an IF downward converting unit 920, a broadcast data outputting unit 930, and an addition data outputting unit 940.

The receiving unit 910 receives a signal wirelessly transmitted from a transmitting side. The received signal as a signal in the RF band may include the broadcasting signal and the addition signal.

Next, the IF downward converting unit 920 downwardly converts a combination signal in the RF band, which is received from the receiving unit 910 into the combination signal in the IF band.

The broadcast data outputting unit 930 receives the combination signal in the IF band, which is downwardly converted by the IF downward converting unit 920, and demodulates and FEC-decodes the received combination signal to output the broadcast data.

The addition data outputting unit 940 receives the combination signal in the IF band, which is downwardly converted through the IF downward converting unit 920 as the input to output addition data based on the DSSS technique. The configuration of the addition data outputting unit 940 will be described in detail in FIG. 10 to be illustrated below.

Although not illustrated in FIG. 9, in another exemplary embodiment of the present invention, the receiving apparatus may include the receiving unit 910, the IF downward converting unit 920, and the addition data outputting unit 930. That is, a receiver that outputs only the addition data may be provided.

Figure 10:
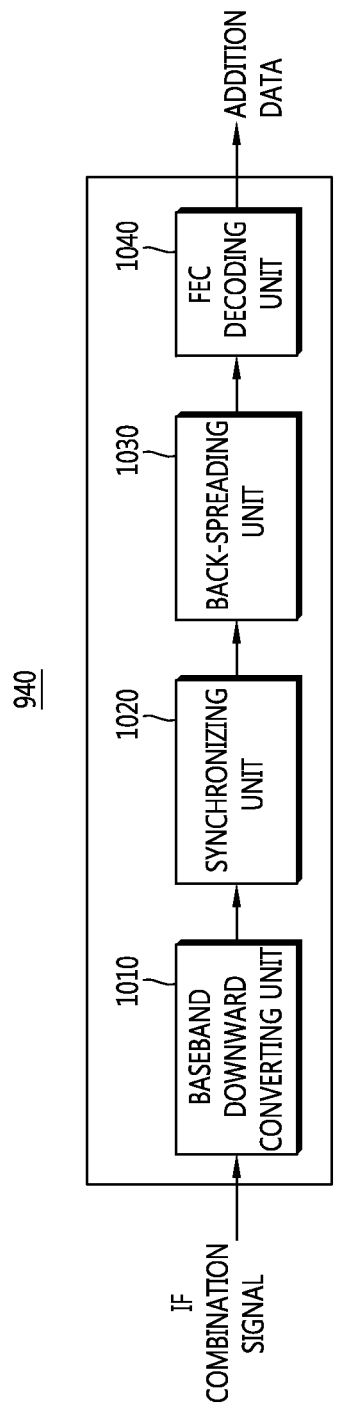
FIG. 10 is a detailed block diagram, in detail, illustrating an addition data outputting unit of the apparatus for addition data reception in the digital broadcast system according to the exemplary embodiment of the present invention.

FIG. 10 is a detailed block diagram, in detail, illustrating the addition data outputting unit 940 of the apparatus for addition data reception in the digital broadcast system according to the exemplary embodiment of the present invention. As illustrated in FIG. 10, the addition data outputting unit 940 according to the exemplary embodiment of the present invention may include a baseband downward converting unit 1010, a synchronization unit 1020, a back-spreading unit 1030, and an FEC decoding unit 1040.

Referring to FIG. 10, the baseband downward converting unit 1010 receives the combination signal in the IF band, which is downwardly converted by the IF downward converting unit 920 as the input and downwardly converts the received combination signal to output a baseband combination signal.

The synchronization unit 1020 sets synchronization of the baseband combination signal which is downwardly converted by the baseband downward converting unit 1010 by using the preamble signal or other synchronization signals.

The back-spreading unit 1030 back-spreads the combination signal synchronized by the synchronization unit 1020 to decrease a bandwidth and increase the magnitude of the signal, thereby generating the back—spread combination signal.

The FEC decoding unit 1040 outputs addition data having high reliability by removing noise generated in the channel from the back-spread combination signal generated by the back-spreading unit 1030.

Figure 11:
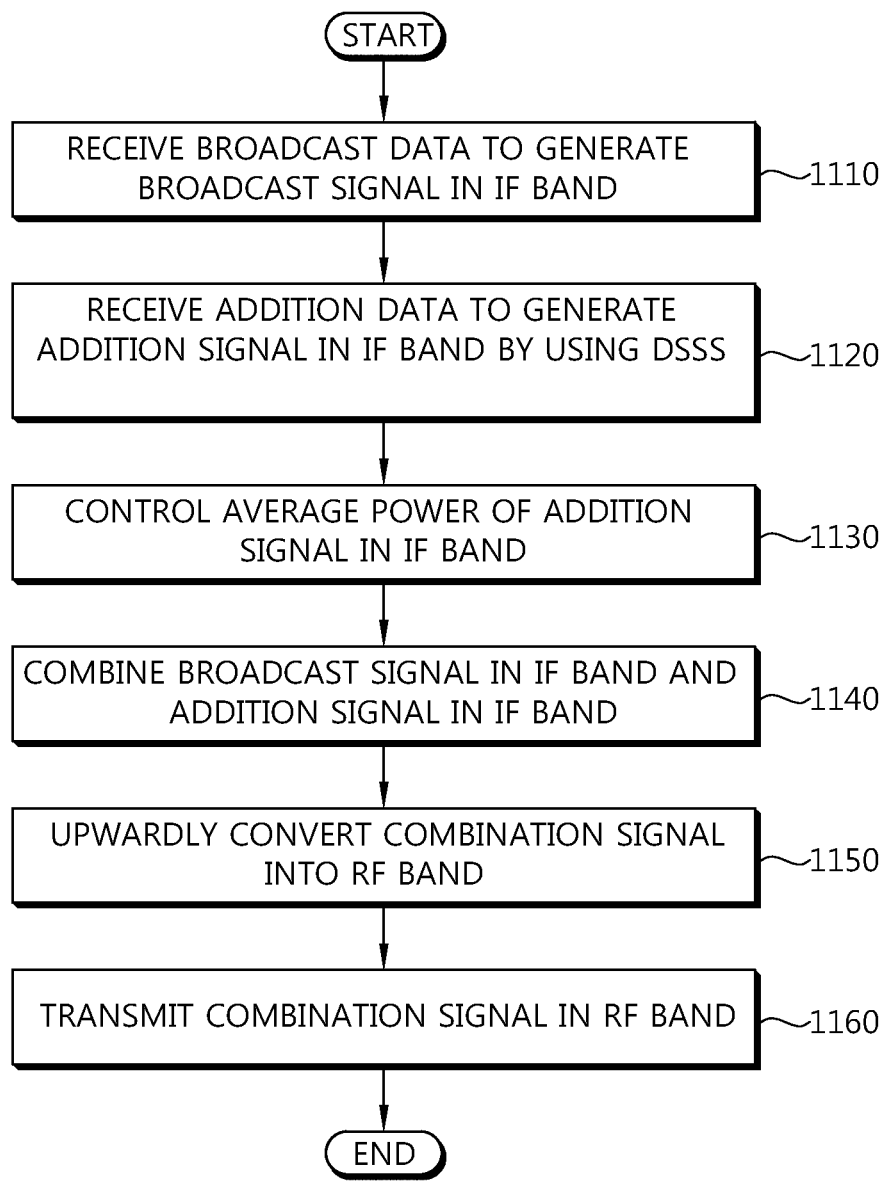
FIG. 11 is a flowchart schematically illustrating a method for addition data transmission in a digital broadcast system according to an exemplary embodiment of the present invention.

FIG. 11 is a flowchart schematically illustrating a method for addition data transmission in a digital broadcast system according to an exemplary embodiment of the present invention. As illustrated in FIG. 11, the method for addition data transmission according to the exemplary embodiment of the present invention may include generating the broadcasting signal in the IF band (1110), generating the addition signal in the IF band (1120), controlling average power of the addition signal in the IF band (1130), combining the broadcasting signal in the IF band and the addition signal in the IF band (1140), upwardly converting the combination signal into the combination signal in the RF band (1150), and transmitting the combination signal in the RF band (1160).

Referring to FIG. 11, in the generating of the IF broadcasting signal (1110), the apparatus for addition data transmission receives the broadcast data as the input to generate the broadcasting signal in the IF band. The apparatus for addition data transmission performs FEC-encoding corresponding to the transmission standard of the broadcast system and performs modulation to the broadcasting signal in the IF band to generate the broadcasting signal in the IF band.

The generating of the IF broadcasting signal (1110) will now be described in more detail. The apparatus for addition data transmission receives the MPEG-2 TS data which is the existing broadcast data as the input and randomly modifies the data to generate randomly modified MPEG-2 TS data. Thereafter, the randomly modified MPEG-2 TS data is outer-encoded by an RS encoding unit (not illustrated) which has the excellent burst error correction ability and the data outer-encoded by the RS encoding unit (not illustrated) is interleaved. Thereafter, the apparatus for addition data transmission inner-encodes the interleaved data by means of a TCM encoding unit (not illustrated) which is a kind of a convolutional code and multiplexes the inner-encoded signal with the field synchronization and segment synchronization signals to convert the multiplexed signal into the baseband ATSC broadcasting signal. Next, a pilot signal for synchronization of the receiver is inserted into the converted baseband ATSC broadcasting signal. Last, a VSB modulating unit (not illustrated) modulates the baseband ATSC broadcasting signal inserted with the pilot signal into the VSB signal in the IF band to generate the broadcasting signal.

Next, in the generating of the IF addition signal (1120), the apparatus for addition data transmission receives the addition data to be additionally transmitted as the input to generate the addition signal in the same IF band as the broadcasting signal in the IF band generated in the generating of the IF broadcasting signal (1110). In this case, the addition signal in the IF band is generated based on the DSSS technique. In the DSSS as a scheme in which one signal symbol is spread at a predetermined sequence to be communicated, when an original signal is inputted into a pseudo-random noise sequence, a band spectrum signal in which power density per frequency is decreased is acquired. Therefore, an extended frequency band is obtained and data may be stably transmitted by reducing a transmission failure. The generating of the IF addition signal (1120) will now be described in detail with reference to FIG. 13.

In the controlling of the average power (1130), the apparatus for addition data transmission controls the average power of the addition signal in the IF band generated in the generating of the IF addition signal (1120). In the controlling of the average power (1130), the apparatus for addition data transmission makes the average power of the addition signal in the IF band be significantly lower than the average power of the broadcasting signal in the IF band by using the insertion level.

In the combining of the signals (1140), the apparatus for addition data transmission combines the addition signal in the IF band, of which the average power is controlled in the controlling of the average power (1130) and the broadcasting signal in the IF band generated in the generating of the IF broadcasting signal (1110), in the IF band to generate the combination signal in the IF band.

In the upwardly converting of the RF-band signal (1150), the combination signal in the IF band generated in the combining of the signals (1140) is upwardly converted into the combination signal in the RF band to generate the combination signal in the RF band.

In the transmission (1160), the apparatus for addition data transmission wirelessly transmits the combination signal in the RF band, which is upwardly converted in the upwardly converting of the RF-band signal (1150) to the receiving side.

According to the exemplary embodiment of the present invention, the method for addition data transmission has an advantage capable of transmitting addition data without changing the existing digital broadcasting apparatus. That is, when the generating of the IF addition signal (1120), the controlling of the average power (1130), and the combining of the signals using the signal combining unit such as the analog combiner (1140) are added to the existing digital broadcasting method, the addition data may be additionally transmitted as in the exemplary embodiment of the present invention.

Figure 12:
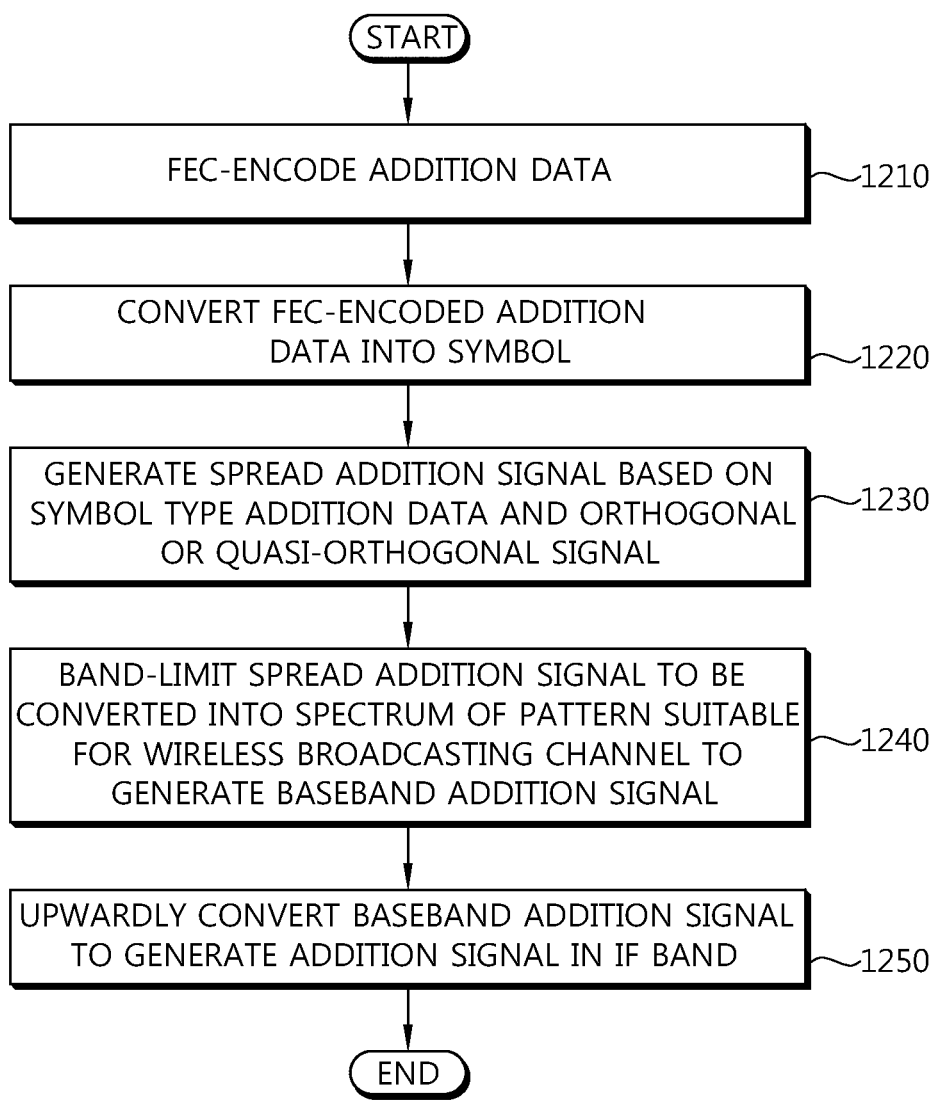
FIG. 12 is a detailed flowchart, in detail, illustrating generating an IF addition signal of the method for addition data transmission in the digital broadcast system according to the exemplary embodiment of the present invention.

FIG. 12 is a detailed flowchart, in detail, illustrating the generating of the IF addition signal (1120) of the method for addition data transmission in the digital broadcast system according to the exemplary embodiment of the present invention. As illustrated in FIG. 12, the generating of the IF addition signal (1120) according to the exemplary embodiment of the present invention may include FEC-encoding (1210), symbol mapping (1220), generating the spectrum-spread addition signal (1230), generating the baseband addition signal (1240), and generating the addition signal in the IF band (1250).

Referring to FIG. 12, in the FEC-encoding (1210), addition data for additional transmission is FEC (forward error correction)-encoded. Herein, the addition data for additional transmission, that is, input data in the FEC-encoding (1210) may be compressed in various methods such as H.264 or MPEG 4 and is not particularly limited thereto as necessary. This may depend on the standard and requirements of the system.

Next, in the symbol mapping (1220), the apparatus for addition data transmission symbol-maps the data FEC-encoded in the FEC-encoding (1210) and converts the data into the symbol-type signal. Herein, various mapping methods may be used, which include binary phase shift keying (BPSK), quadrature phase shift keying (QPSK), quadrature amplitude modulation (QAM), and the like and the mapping method is not particularly limited thereto. This may depend on the standard and requirements of the system.

In the generating of the spread addition signal (1230), a spread addition signal is generated based on the symbol-type addition data generated in the symbol mapping (1220) and the orthogonal or quasi-orthogonal signal for spectrum-spreading the addition data. The generating of the spread addition signal (1230) may include generating the spread signal (not illustrated) and multiplication (not illustrated). In the generating of the spread signal, the apparatus for addition data transmission generates the orthogonal or quasi-orthogonal signal for spectrum-spreading the addition data. According to the exemplary embodiment of the present invention, the orthogonal signal may the Walsh signal and the quasi-orthogonal signal is the psendo noise (PN) signal. The orthogonal signal and the quasi-orthogonal signal are not limited to the Walsh signal and the PN signal, but may depend on the standard and the requirements of the system. In the multiplication, the apparatus for addition data transmission multiplies the orthogonal or quasi-orthogonal signal generated in the generating of the spread signal by the symbol-type addition signal generated in the symbol mapping (1220). This process is called spreading. According to the exemplary embodiment of the present invention, the sampling frequency of the spread signal may be N times more than the sampling frequency of the output signal in the symbol mapping (1220). In this case, the output signal in the symbol mapping (1220) has a spreading a gain as large as $10 \log_{10} N$ dB due to spreading.

Next, in the generating of the baseband addition signal (1240), the apparatus for addition data transmission bandwidth-limits the signal generated in the generating of the spectrum-spread addition signal (1230), that is, the addition signal spectrum-spread by the spread signal to convert the signal into the spectrum of the type suitable for the wireless broadcasting channel, thereby generating the baseband addition signal. According to the exemplary embodiment of the present invention, the PSF is used in the generating of the baseband addition signal (1240), and as the PSF, filters may be used, which include the root raised cosine (RRC) filter, the Gaussian filter, the equi-ripple (ER) filter, and the like according to the spectrum type, however, the PSF is not particularly limited thereto. Selection of the PSF may depend on the standard and requirements of the system.

In the upwardly converting of the IF-band signal (1250), the apparatus for addition data transmission converts the baseband addition signal generated in the generating of the baseband addition signal (1240) into the signal in the IF band.

Figure 13:
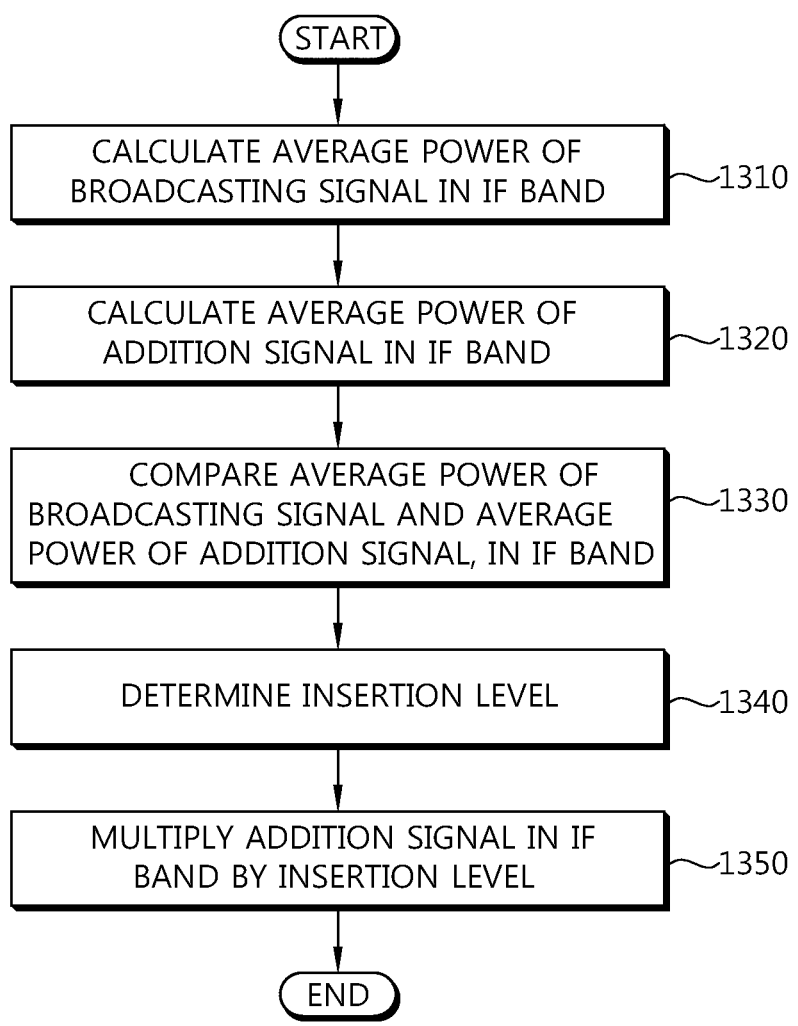
FIG. 13 is a detailed flowchart, in detail, illustrating controlling average power of the method for addition data transmission in the digital broadcast system according to the exemplary embodiment of the present invention.

FIG. 13 is a detailed flowchart, in detail, illustrating the controlling of the average power (1130) of the method for addition data transmission in the digital broadcast system according to the exemplary embodiment of the present invention. As illustrated in FIG. 13, the controlling of the average power (1130) according to the exemplary embodiment of the present invention may include calculating the average power of the broadcasting signal in the IF band (1310), calculating the average power of the addition signal in the IF band (1320), comparing the average power of the broadcasting signal and the average power of the addition signal in the IF band (1330), determining the insertion level (1340), and multiplying the addition signal in the IF band by the insertion level (1350).

Referring to FIG. 13, in the calculating of the first average power (1310), the apparatus for addition data transmission calculates average power of the broadcasting signal in the IF band or RF band. In the calculating of the second average power (1320), the apparatus for addition data transmission calculates average power of the addition signal in the IF band or RF band.

Next, in the comparing of the average power (1330), the apparatus for addition data transmission compares the average power of the broadcasting signal calculated in the calculating of the first average power (1310) and the average power of the addition signal calculated in the calculating of the second average power (1320). In the determining of the insertion level (1340), the insertion level $\alpha$ is determined based on the comparison result. The insertion level $\alpha$ is the constant that makes the average power of the addition signal be significantly lower than the average power of the broadcasting signal.

In the multiplication (1350), the apparatus for addition data transmission multiplies the addition signal in the IF band or RF band by the insertion level $\alpha$ determined in the determining of the insertion level (1340). In the multiplication (1350), the addition signal in the IF band or RF band is multiplied by the insertion level $\alpha$ to control the average power of the addition signal in the IF band or RF band. The average power of the addition signal in the IF band or RF band is made to be significantly lower, and as a result, the existing receiver may recognize additional data as noise.

Figure 14:
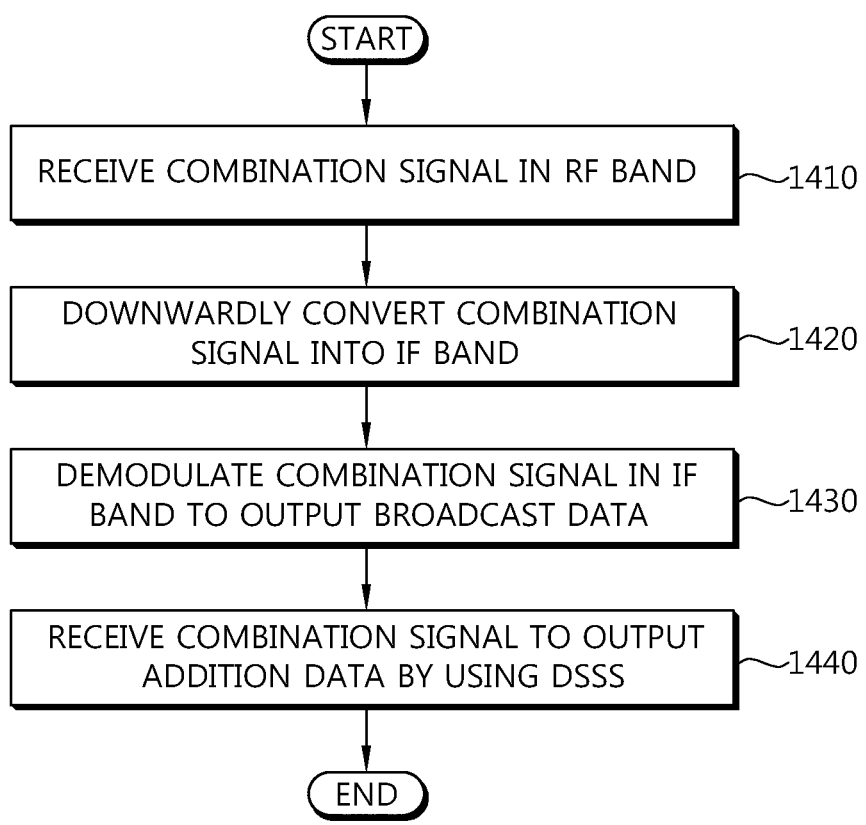
FIG. 14 is a flowchart schematically illustrating a method for addition data reception in the digital broadcast system according to the exemplary embodiment of the present invention.

FIG. 14 is a flowchart schematically illustrating a method for addition data reception in the digital broadcast system according to the exemplary embodiment of the present invention. As illustrated in FIG. 14, the method for addition data reception according to the exemplary embodiment of the present invention may include receiving the combination signal in the RF band (1410), downwardly converting into the IF band (1420), outputting the broadcast data (1430), and outputting the addition data (1440).

In the reception (1410), the apparatus for addition data reception receives the signal wirelessly transmitted from the transmitting side. The received signal as the signal in the RF band may include the broadcasting signal and the addition signal.

Next, in the downwardly converting into the IF band (1420), the apparatus for addition data reception downwardly converts the combination signal in the RF band, which is received in the reception (1410) into the signal in the IF band.

In the outputting of the broadcast data (1430), the apparatus for addition data reception receives the combination signal in the IF band which is downwardly converted in the downwardly converting into the IF band (1420), and demodulates and FEC-decodes the received combination signal to output the broadcast data.

In the outputting of the addition data (1440), the apparatus for addition data reception receives the combination signal in the IF band which is downwardly converted in the downwardly converting into the IF band (1420) as the input to output the addition data based on the DSSS technique. The outputting of the addition data (1440) will be described in detail with reference to FIG. 15 below.

FIG. 15 is a detailed flowchart, in detail, illustrating the outputting of the addition data (1440) of the method for addition data reception in the digital broadcast system according to the exemplary embodiment of the present invention. As illustrated in FIG. 15, the outputting of the addition data (1440) according to the exemplary embodiment of the present invention may include downwardly converting the baseband (1510), synchronization (1520), back-spreading (1530), FEC-decoding (1540), and outputting (1550).

Referring to FIG. 15, in the downwardly converting of the baseband (1510), the apparatus for addition data reception receives the combination signal in the IF band, which is downwardly converted in the downwardly converting into the IF band (1420) as the input and downwardly converts the received combination signal to output the baseband combination signal.

In the synchronization (1520), the apparatus for addition data reception synchronizes the baseband combination signal which is downwardly converted in the downwardly converting of the baseband (1510) by using the preamble signal or other synchronization signals.

In the back-spreading (1530), the apparatus for addition data reception back-spreads the combination signal synchronized in the synchronization (1520) to decrease the bandwidth and increase the magnitude of the signal, thereby generating the back-spread combination signal.

In the FEC-encoding (1540), the noise generated in the channel is removed from the back-spread combination signal generated in the back-spreading (1530).

In the outputting (1550), addition data having high reliability, from which the noise is removed is outputted.

According to the apparatus and the method for transmitting and receiving addition data in the digital broadcast system according to the exemplary embodiments of the present invention, addition data is transmitted and received, which can ensure excellent reception performance in at the low SNR and under a multi-path environment while maintaining backward compatibility with the existing broadcasting signal without changing the existing digital broadcast system.

Although the embodiments of the present invention have been disclosed for illustrative purposes, it will be appreciated that the present invention is not limited thereto, and those skilled in the art will appreciate that various modifications and changes are possible, without departing from the scope and spirit disclosed by the appended claims of the present invention.

What is claimed is:

1. An apparatus comprising:
    an IF broadcasting signal generating unit configured to forward error correct (FEC) and modulate received broadcast data to generate an intermediate frequency (IF) band broadcasting signal;
    an IF addition signal generating unit configured to receive addition data and generate an IF-band addition signal by performing direct sequence spread spectrum (DSSS) modulation on the addition data;
    an average power controlling unit configured to control average power of the IF-band addition signal;
    a signal combining unit configured to combine the IF-band broadcasting signal and the IF-band addition signal to generate a combination signal;
    an RF upward converting unit configured to up-convert the combination signal to a combination signal in a radio frequency (RF) band; and
    a transmitter configured to transmit the combination signal in the RF band.

2. The apparatus of claim 1, wherein the IF-band addition signal and the IF-band broadcasting signal are in one IF band.

3. The apparatus of claim 1, wherein the IF addition signal generating unit includes:
    an FEC encoding unit configured to FEC-encode the addition data;
    a symbol mapper configured to convert the FEC-encoded addition data into at least one symbol to generate symbol-type addition data;
    a signal synthesizing unit configured to generate a spread addition signal based on the symbol-type addition data and an orthogonal or quasi-orthogonal signal for spectrum-spreading the addition data;
    a pulse shaping filter (PSF) configured to band-limit the spread addition signal into a spectrum suitable for a wireless broadcasting channel to generate a baseband addition signal; and
    an IF upward converting unit configured to up-convert the baseband addition signal to generate the IF-band addition signal.

4. The apparatus of claim 3, wherein the IF addition signal generating unit further includes a preamble signal generator configured to generate a preamble signal that is repeated periodically and a multiplexor configured to perform serial concatenation of the preamble signal and the spread addition signal.

5. The apparatus of claim 3, wherein a sampling frequency of the spread addition signal is an integer N times more than a sampling frequency of the symbol mapper.

6. The apparatus of claim 1, wherein the average power controlling unit includes:
    a first average power calculating unit configured to calculate average power of the IF-band broadcasting signal;
    a second average power calculating unit configured to calculate average power of the IF-band addition signal;
    an insertion level determining unit configured to compare the average power of the IF-band broadcasting signal and the average power of the IF-band addition signal to determine an insertion level, wherein the insertion level is a constant that adjusts the average power of the IF-band addition signal to be significantly lower than the average power of the IF-band broadcasting signal; and
    a multiplying unit configured to multiply the IF-band addition signal by the insertion level.

7. An apparatus comprising:
    an IF broadcasting signal generating unit configured to receive forward error correct (FEC) and modulate received broadcast data to generate an intermediate frequency (IF) band broadcasting signal;
    a first RF upward converting unit configured to upwardly convert the IF-band broadcasting signal into a radio frequency (RF) band broadcasting signal;
    an IF addition signal generating unit configured to receive addition data and generate an IF-band addition signal by performing direct sequence spread spectrum (DSSS) modulation on the addition data;
    a second RF upward converting unit configured to up-convert the IF-band addition signal into an RF-band addition signal;
    an average power controlling unit configured to controlling average power of the addition signal;
    a signal combining unit configured to combining the RF-band broadcasting signal and the RF-band addition signal to generate an RF-band combination signal; and a transmitter configured to transmitting the RF-band combination signal.

8. The apparatus of claim 7, wherein the IF addition signal generating unit includes:

an FEC encoding unit configured to FEC-encode the addition data;

a symbol mapper configured to convert the FEC-encoded addition data into at least one symbol to generate symbol-type addition data;

a signal synthesizing unit configured to generating a spread addition signal based on the symbol-type addition data and an orthogonal or quasi-orthogonal signal for spectrum-spreading the addition data;

a pulse shaping filter (PSF) configured to band-limit the spread addition signal into a spectrum suitable for a wireless broadcasting channel to generate a baseband addition signal; and an IF upward converting unit configured to up-convert the baseband addition signal to generate the IF-band addition signal.

9. The apparatus of claim 7, wherein the average power controlling unit includes:

a first average power calculating unit configured to calculate average power of the RF-band broadcasting signal;

a second average power calculating unit configured to calculate average power of the RF-band addition signal;

an insertion level determining unit configured to compare the average power of the RF-band broadcasting signal and the average power of the RF-band addition signal to determine an insertion level, wherein the insertion level is a constant that adjusts the average power of the RF-band addition signal to be significantly lower than the average power of the RF-band broadcasting signal; and a multiplying unit configured to multiply the RF-band addition signal by the insertion level.

* * * * *